JOHN KAUFMANN
WOODROW L. HAYES
INVENTORS

JOHN KAUFMANN
WOODROW L. HAYES
INVENTORS

JOHN KAUFMANN
WOODROW L. HAYES
INVENTORS

JOHN KAUFMANN
WOODROW L HAYES
INVENTORS

JOHN KAUFMANN
WOODROW L. HAYES
INVENTORS

United States Patent Office 2,977,841
Patented Apr. 4, 1961

2,977,841

INTERFEROMETER OPTICAL SYSTEM

John Kaufmann, Johnson City, and Woodrow L. Hayes, Binghamton, N.Y., assignors to General Precision, Inc., a corporation of Delaware Filed Sept. 12, 1956, Ser. No. 609,467

20 Claims. (Cl. 88—14)

The present invention relates to light interferometric measuring devices and more particularly to an improved optical system for making extremely accurate measurements.

The use of interferometric devices for making precise and absolute measurements of the dimensions of articles has been known for a substantial period, and may be exemplified by the method which involves a comparison of interference fringes caused by light of different wavelengths. At best this and other methods of the older prior art were extremely laborious and exacting with the result that they could be made only under laboratory conditions. It was not until recent years that means were known for making absolute measurements of an article of any size by an actual electronic count of the successive interference fringes, thereby providing accurate measuring and inspection instruments for industry. In such devices, a light beam is formed from a light source emitting sharp spectral lines and directed to a half-reflecting mirror (half of the light energy passes through the mirror) or beam splitter. The light passing through this is applied to a first total reflecting mirror which has a linear position with respect to the half-reflecting mirror commensurate with the position of the measuring head of the micrometer. While the light reflected back from the half-reflecting mirror is applied to still another and second total reflecting mirror having discrete reflecting surfaces separated by a determined fraction of a wavelength. When the light energy reflected from each of these total reflecting mirrors returns to the half-reflecting mirror the light energy of each are combined to form by interference a beam of light energy containing two fields of illumination whose intensities vary cyclically as a function of the position of the first total reflecting mirror relative to half-reflecting mirror, this distance being a variable commensurate with the measurement being taken. Since these variations of the two fields are out of phase, transitions occur therein through complete intensity ranges in accordance with the position of the first total reflecting mirror. The particular positioning of the discrete reflecting surfaces separated by a known fraction of a wavelength will determine the geometrical distribution of these two out of phase fields in the combined beam. Optical outputs are provided to feed these two fields of illumination to photo sensitive devices to generate a two phase electrical output which may operate a counter in accordance with the position of the first total reflecting mirror. In addition to its many virtues these interferometric micrometer devices have several critical features. One of these is that it is difficult to maintain the necessary and critical angular adjustment between the movable first total reflective mirror and the second total reflective mirror with two discrete surfaces. Any misadjustment of this critical orientation often results in substantial departure from the selected phase relation and intensity of the two fields of illumination. One of the methods of avoiding this critical adjustment was the use of two cube corner prisms instead of the two totally reflective mirrors. This method of avoiding this critical adjustment has several very serious limitations. One of these is that prisms are considerably more expensive than mirrors. Another results from the fact that if a coating were applied to one of the surfaces of a prism in order to provide retardation by a determined fraction of a wavelength in order to form by interference at the beam splitter two fields of illumination which are out of phase, the location of the area of this coating is very important as to the requirement for maintaining relatively equal fields of illumination (equal intensity) for the two phases compared to the coating of mirror in the prior art. Further because of the cost of the prism compared to a mirror, any error which spoils the reflecting member such as making the coating too thick, is more expensive when made on a prism. Also, as is well known, there are several surfaces or orientations of a prism from which to choose in using them for reflecting member. Because prisms are imperfect at best and there is an optimum relationship between the orientation of the fixed and movable reflecting prisms such that matching is needed to make the selection. As a result the selection of the orientation needs to be made prior to the coating and requires that the optical system be completely assembled. Only after this selection or matching can the prism be disassembled and coated.

The present invention in a preferred embodiment avoids these problems by using prisms for the reflecting members in place of mirrors and making no attempt to coat these prisms. Instead according to the present invention the less expensive beam splitter of the prior art is coated in a manner such that it provides two functions. First, it splits the light beam emanating from the source of light such that half of the light energy goes to a fixed reflective prism and secondly the other half of the light energy is directed to the reflective prism movable with the measuring head through a partial coating of proper thickness to provide the desired retardation of one half of this light energy (one-fourth of the total light energy). These split light beams are each reflected from the respective reflective prisms and recombined to form two fields of illumination phase shifted by a desired amount determined by the thickness of the coating whose intensities vary cyclically as a function of the position of the reflective prism movable with the measuring head. Thus the advantages of using reflective prisms are gained without the disadvantages of coating either prism. If the coating on the beam splitter is made thicker than desired and a new beam splitter has to be coated, the economic loss is not great compared to cost of a new prism. Further, unlike the problems in coating a surface of a prism, if the area of coating on the beam splitter is in error and not one half of the area, the maximum intensities of the two fields of illumination created by the coating can be equalized by moving the beam splitter in its plane to provide equal effective coated and uncoated areas in the light beam. In addition, the coating step, in the manufacture of the interferometric measuring devices need no longer follow the often tedious and laborious task of matching the two prisms for optimum orientation. Other embodiments of the present invention set forth hereinafter avoid the problems of the prior art in a similar manner with similar resulting advantages. One additional feature of the present invention results from the imperfections found in the use of prisms as reflecting members. Specifically, it would be desirable that each reflecting prism have reflecting surfaces which are mutually perpendicular such that the reflected rays and incoming rays are parallel. However, in actual practice they seldom are. The result is when prisms are used for the fixed total reflecting member and the total reflecting member movable with the measuring head there is an angular error between the incoming light rays and the reflected rays of each. In order for these split light beams to be recombined to provide optimum fringes or light and dark fields of illumination by interference, it is necessary that the recombination means be angularly positioned to render the interfering wave front of both halves of the interference field parallel. As already discussed above, by matching these two prisms by trial and error the optimum orientation can be selected for each as to its cooperation with the other. Another way of stating this would be that each prism is oriented such that the angular error between the retarded and unretarded reflected rays of one split beam is approximately the same as the angular error between corresponding rays of the other split beam so that a single direction of the normal of the beam recombining surface will bisect the angle between the rays which are to be recombined for both the retarded and unretarded portions of the aperture, within the required accuracy. Because this angular error exists in each prism the beam splitter functioning to split the beams may never be angularly oriented to render parallel the interfering wave fronts from each prism and thus give optimum performance in recombining the two beams and forming the two fields of illumination by interference. For this reason the improved optical system of the present invention uses an additional beam splitter to function as a recombining member which may have an angular orientation calculated to render the interfering wave-front of each of the prisms parallel.

It is therefore a primary object of the present invention to provide an improved interferometric measuring device with fewer critical manufacturing tolerances.

It is another object of the present invention to provide two fields of illumination characterized by the recombination of two split beams, one of which has two portions whose optical path lengths differ by a desired fraction of a wavelength.

It is still another object of the present invention to provide an improved interferometric measuring device which utilizes a half reflecting mirror containing a partial coating with a thickness commensurate with the amount of phase shift desired.

It is a further object of the present invention to provide an improved interferometric measuring device which utilizes reflective prisms.

It is another object of the present invention to provide an improved interferometric measuring device which avoids the use of discrete reflecting surfaces to provide two fields of illumination differing by a desired fraction of a wavelength.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings in which.

Figure 1:
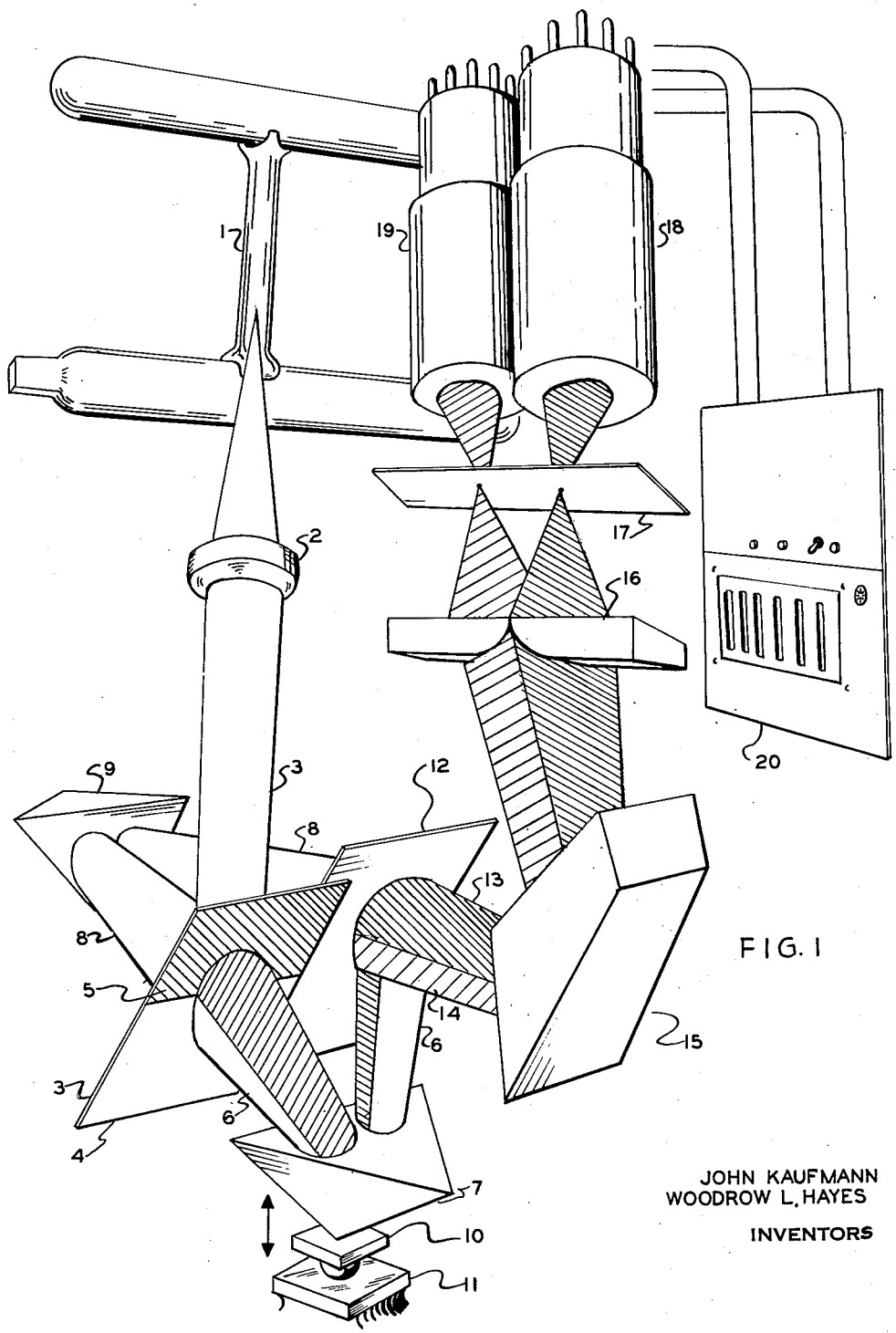
Fig. 1 is a pictorial view of a preferred embodiment of the present invention.

In the figures described below illustrating several embodiments of the present invention similar elements have the same numerical designations. Referring to Fig. 1 a light source 1 is provided which is preferably a tube capable of emitting sharp spectral lines, such as a Krypton discharge tube. The light from this source is directed through a collimating lens 2 to a beam splitter 4 which has a half-reflecting surface on the side hidden from view. The beam of light 8 reflected back from this surface is directed toward reflective prism 9 which functions to change the direction of the light beam 8 and directs it toward recombining beam splitter 12 which has a half-reflecting surface on the side not hidden from view. The half-reflecting surface on beam splitter 12 is indicated by the shaded line 24 in Fig. 2. Meanwhile the beam of light 6 which goes through the beam splitter 4 is directed toward the reflected prism 7. It should be noted that while reflecting prism 7 has been shown in the figures as a cube corner prism, any other reflecting means which reflects light rays with a deviation of essentially 180° may be substituted therefor. Examples of these alternatives are reflective prisms, dihedral mirrors, roof prisms and trihedral prisms. It should be noted that half of the non-reflecting surface of beam splitter 4 contains a coating 5 of determined thickness the purpose of which is to retard approximately half of the light energy of beam 6 thereby causing a phase shift by a selected fraction of a wavelength relative to the other half of beam 6. This retarding coating may be made of many transparent materials and has been successfully formed by vacuum evaporation through a mask of some substance such as magnesium fluoride or silicon oxide. In practice it has been found desirable to make the coating of a thickness that will retard part of the beam a quarter of a wavelength. As will be discussed below it is desirable that about half the split light beam 6 be retarded. Reflective prism 7 is fixed to and movable with a measuring head 10 whose net change of position relative to anvil 11 is to be measured. The drive means for measuring head may be of several types besides manual. The electrical-motive drive means disclosed in Patent No. 2,604,004 by Elihu Root III or disclosed in United States Patent No. 2,880,514 granted on April 7, 1959, to W. W. Wood, Jr. and assigned to the same assignee are examples of useful means with which to position measuring head 10 relative to the product to be measured. Partially phase shifted light beam 6 is reflected from reflective prism 7 and directed toward recombiner member 12 which may have a construction similar to that of a beam splitter. The surface or recombiner member 12 in view in Fig. 1 is reflective such that when split beam 6 is directed thereon by movable reflective prism 7 it is reflected and combined with split beam 8 which is directed by fixed reflective prism 9 through recombiner member 12. On combination, these two beams form by light interference two fields of illumination 13 and 14 phase shifted by the coating on beam splitter 4 and whose intensities vary cyclically as a function of the position of reflective prism 7 movable with measuring head 10 relative to anvil 11. In this regard it should be noted that the variable path length of split light beam 6 varies with respect to the fixed path length of split light beam 8 is accordance with the position of movable reflective prism 7; thereby causing the cyclical variation of intensities in each of these two fields of illumination.

As suggested above, one of the advantages of putting the retarding coating on the beam splitter member 4 is that the effective area of this coating is critical in determining that the two fields of illumination formed at the combining member 12 have equal intensity variations. In accordance with the present invention if the two fields of illumination do not have equal intensity variations, the beam splitter 4 may be adjusted laterally in its own plane to make them equal by means not shown. It will be apparent in the discussion of the counting means set forth below, why it is desirable that these intensity ranges should be approximately equal. If the retardation coating were on the reflective prism as shown in the prior art, such desirable adjustment would not be possible.

Figure 2:
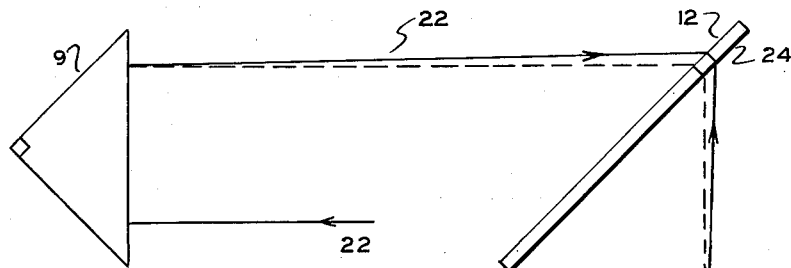
Fig. 2 is a diagrammatic view depicting the effect of angular error on the present invention.

As already suggested above, one of the disadvantages of using reflective prisms instead of mirrors for total reflecting members is that prisms at best are imperfect and have what is known as angular error. The purpose of Fig. 2 is to illustrate this angular error and the method used by the present embodiment to nullify the effects of this error. Referring to Fig. 2, movable reflective prism 7 and fixed reflective prism 9 are shown in two dimensional view. A light ray each of split beam 8 and split beam 6 is illustrated by lines 22 and 23 respectively and are directed toward fixed prism 9 and movable prism 7 from beam splitter 4 (not shown). Because of the referred to imperfections of prisms the vertex angles of prisms 9 and 7 are not, generally, exactly ninety degrees as illustrated but vary such that the reflected rays 22 and 23 are not parallel (ideally shown by dotted lines) to their respective incoming rays. The angle between the idealized parallel and the actual reflected ray is known as the "angular error" of a prism. Inasmuch as there is no way to avoid this angular error without prohibitive cost, the present invention nullifies the effect by selecting or matching the orientation of these two prisms. Actually, the separate beam splitter and recombining member design does not correct for angle error between the idealized parallel and the actual reflected ray, but it reduces the problem of matching prisms from matching two angle magnitudes and orientations (one for each half of the aperture of each split beam) to that of matching one angle magnitude and orientation of the two prisms, namely the angle between the reflected rays of the two halves of the aperture of each split beam. The difference in the angular error (this having both magnitude and orientation, as may be represented by a vector) of the two portions of each split beam is approximately the same and therefore such that when the beam recombines is so oriented that it bisects the rays 22 and 23 directed toward it in one portion of the aperture, it is simultaneously corrected oriented to bisect the rays 22 and 23 directed toward it in the other portion of the aperture, these portions of the aperture being distinguished in that ray 23 has an optical path length which differs in the two portions of the aperture by an amount which is approximately an odd multiple of $\pi/4$. Because of this requirement for the recombining member and the fact that there is always an angular error of some magnitude, it follows that the same half reflecting mirror cannot be used as a beam splitter and a recombining means. For this reason the present invention as illustrated in Fig. 1 suggests the use of a separate recombination means 12 whose angular orientation can be adjusted such that it bisects the intersection of split light beams 8 and 6 thereby allowing optimum recombination. It should be noted that Fig. 1 recombination member 12 is oriented at a different angle than beam splitter 4.

As already indicated, the need for selecting, or matching the fixed and movable reflective prisms by trial and error with the optical system completely assembled in order to select orientations of each such that the angular error of each is approximately equal, is a substantial reason for not applying a retardation coating to the prism. Otherwise the application of the coating on a prism would require complete assembly and alignment of the optical system to make the selection and the disassembly of the prism for coating and further assembly and alignment would then be necessary.

Figure 6:
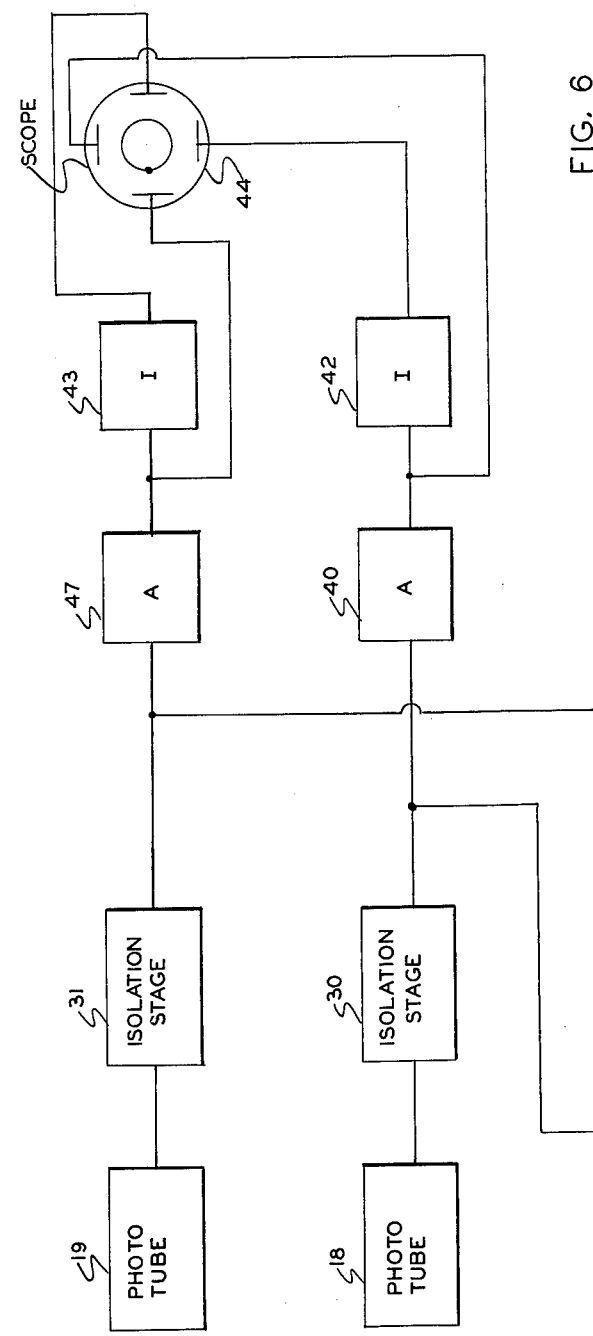
Fig. 6 is a block diagram of the photo-tube and electronic counter useful in understanding the present invention.
Figure 6:
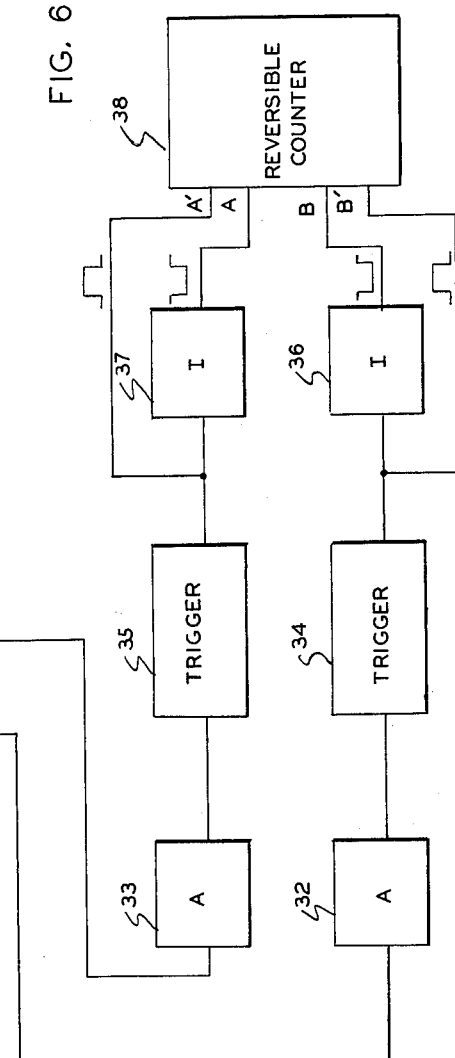

As already suggested, the recombined beam formed by interference comprises two fields of illumination 13 and 14 phase shifted by a desired amount determined by the thickness of the retardation coating whose intensities vary cyclically as a function of the position of the reflective prism 7 movable with the measuring head 10. Since variable intensity fields of illumination 13 and 14 are out of phase the transition of each through complete intensity ranges occurs for the two fields in different position regions of the measuring head 10 (and reflective prism 7) relative to anvil 11. It has been found practical that this phase difference between these two variable intensity fields of illumination be one fourth of a wavelength or ninety degrees. However, the degree of phase shift is a matter of choice. Thus the number of transitions (complete cycles of light intensity) of each of these fields of illumination is a measure of the net movement of the measuring head 10 relative to the anvil 11. Since the combined beam contains two fields of illumination 13 and 14 which are out of phase by 90 degrees movement of the measuring head 10 (for example increasing the path length of split beam 6) in one direction causes the intensity of one of the fields of illumination 13 for example to vary cyclically and lead the intensity of the other field of illumination 14 which is also varying cyclically by a phase angle of 90 degrees. While movement of the measuring head 10 in the other direction (for example decreasing the path length of split beam 6) causes the cyclically varying intensity field 13 to lag the cyclically varying field 14. In summary, the number of cycle transitions of the intensity of each of the fields is a measure of the movement of the measuring head 10. While the relative phase relationships (leading or lagging) of the cyclic transitions of these two fields is an indication of the direction of movement of the measuring head 10. The improved interferometric optical measuring system of the present invention referred to above, utilizes photo tubes 18 and 19 positioned such as to be responsive to the two out of phase fields of illumination 13 and 14 in a manner similar to the system of Patent No. 2,604,004 referred to above. The out of phase electrical outputs are used in a manner also similar to that disclosed in Patent No. 2,604,004 to actuate an electrical counter in accordance with the number of transitions (changes of state) these two fields make through complete intensity ranges (changes of state). As already suggested, the electrical count will be in one direction when the cyclic intensity variation of field 13 leads the cyclic intensity variation of field 14. The electrical count will be in the other direction when the cyclic intensity variation of field 13 lags the cyclic intensity variation of field 14. The counter 20 described in more detail below relative to Fig. 6 is unresponsive to intensity variations of one of the fields 13 or 14 alone. Thus the net counter indication and the net number of transitions or changes of state of both fields through complete intensity ranges is commensurate with position of the movable reflective prism 7 and the measuring head 10 relative to the anvil 11.

As indicated, the source of light disclosed is a Krypton discharge tube 1 which emits several spectral lines each representing a different color and frequency. The analysis of the optical system of the present invention as set forth in Fig. 1 may be applicable to any one of the spectral lines. In Fig. 1 since the source has several of these spectral lines the recombined beam has two phase shifted fields of illumination for each of these spectral lines. However, since the retardation coating of Fig. 1 was of a particular thickness in order to give only one of these spectral lines, a 90° phase is desirable to make the counting means responsive to the two fields of illumination 13 and 14 of that selected spectral line only. This is accomplished by directing the recombined beam through constant deviation prism 15 in order to spread out these spectral lines in a well known manner and direct the two fields of illumination 13 and 14 to selected apertures on plate 17 through dividing lenses 16. In this way photo tubes 18 and 19 may be made to be responsive to magnitude, or intensity variations of the fields 13 and 14 of the selected spectral line. The choice of the particular spectral line to use is a matter of making many considerations not within the scope of the present invention. Generally, however, the high frequencies give higher accuracies in the measurement of the movement of the measuring head subject to the limitation that the alignment and design of the optical system for spectral lines of higher frequencies are more critical. The manner of elimination, from the optical system of those spectral lines which are not utilized is a matter of choice subject to many workable arrangements. For example, the prism 15 of Fig. 1 might well be repositioned in the light beam to a position near the source of light. Also a source of light could be selected which emits only one spectral line.

A block diagram of photo tubes 18 and 19 and digital counter 20 are set forth in Fig. 6. As already suggested, one way to measure the cyclic transitions of the phase shifted fields of illumination 13 and 14 described above is to convert these to electrical sinusoidal waves in the outputs of photo tubes 18 and 19. Many known means are available to electrically count the transitions or cycles of these sinusoidal outputs of each of the photo tubes 18 and 19 which are reversibly responsive to the 90° leading or lagging phase relationship of each as would be necessary to indicate the net movement of measuring head 10, as discussed above. By way of example, the Patent No. 2,604,004 identified above, illustrates one means which has a desirable high speed response, but is limited as to the number of transitions of cycles which can be counted. In addition, two patent applications, assigned to the same assignee as the present application, disclose reversible counters comprising cold-cathode, multi-electrode gaseous discharge tubes and circuitry which may be represented by block 38 of Fig. 6. The first of which has now issued as Patent Number 2,833,476, dated May 6, 1958, entitled "Reversible Counter" by Monson H. Hayes and James L. West and the second is patent application No. 454,292, filed September 7, 1954 entitled "Reversible Counter" by John Kaufmann. Each of these cold-cathode, multi-electrode gaseous discharge tube counters is reversibly responsive to a large number of transitions or cycles of the electrical outputs from photo tubes 18 and 19 thereby allowing for large movements of the measuring head 10. The outputs of photo tubes 18 and 19 are fed to reversible counter 38 through conventional isolation stages 30 and 31, conventional amplifying stages 32 and 33 and conventional triggers 34 and 35. The triggers function to convert the sinusoidal outputs from the photo tubes to square waves. Each are inverted to provide two additional inputs to the reversible counter 38. The method of presentation of an indication of the net number of transitions of fields of illumination 13 and 14 is not important to present invention and may be found in either of the above identified patent applications.

The reversible counter 38 while very accurate in counting the number transitions of the fields 13 and 14 represented by the sinusoidal outputs of the photo tubes 18 and 19 respectively, it is unresponsive to the movements of the measuring head 10 which provides less than a complete transition of the fields 13 and 14 and a complete sinusoidal voltage output of photo tubes 18 and 19 respectively. Accordingly cathode ray tube 44 of Fig. 6 is provided in the identical manner shown in Patent No. 2,604,004 to give interpolation, fractional vernier counts for small movements of the measuring head 10 which provide fraction transition of fields 13 and 14 rather than a complete cycle. The output voltage from photo tube 18 is fed to one pair of deflection plates of tube 44, through conventional amplifier 40. Conventional inverter 42 inverts the output voltage of amplifier 40 prior to application of this voltage to one of these deflection plates. The output voltage from photo tube 19 is fed to the other pair of deflection plates of tube 44 through conventional amplifier 47. Conventional inverter 43 inverts the output voltage of amplifier 47 prior to application of this voltage to one of these deflection plates. It will thus be apparent to those skilled in the art that the application of these in sinusoidal voltages which vary in phase both in time and space by 90 degrees will cause a raster to form a rotating trace on the screen of the tube, thus transition, as cyclic variation of the two fields 13 and 14 through part of a complete intensity range and a corresponding voltage variation in the output of photo tubes 18 and 19, will result in a partial trace rotation on the cathode ray tube 44.

Fig. 1 shows the improved interferometric optical system of the present invention where the retardation coating 5 providing a phase shift is placed on the non-reflective surface of the beam splitter 4, thereby avoiding the undesirable design considerations and limitations resulting from the provision of discrete reflecting surfaces for the same purpose in accordance with the prior art. Many modifications may be made within the spirit of the present invention. By way of example Figs. 3, 4 and 5 each illustrate several modifications. It should be noted in consideration of each of these modifications that no coating is placed on either the critical fixed or movable reflective prisms. Furthermore, it should be noted that each utilizes a retardation coating to provide the desired phase shift rather than the discrete reflecting surfaces of the prior art, which are of limited use, since they must be placed on either the fixed or movable total reflecting members.

Figure 3A:
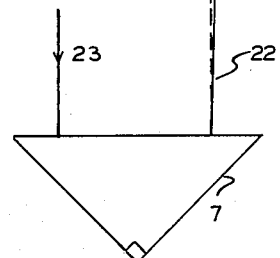
Figs. 3A, 3B and 3C are diagrammatic views showing various modifications of the present invention with a partial retarding coating on the beam splitter.
Figure 3A:
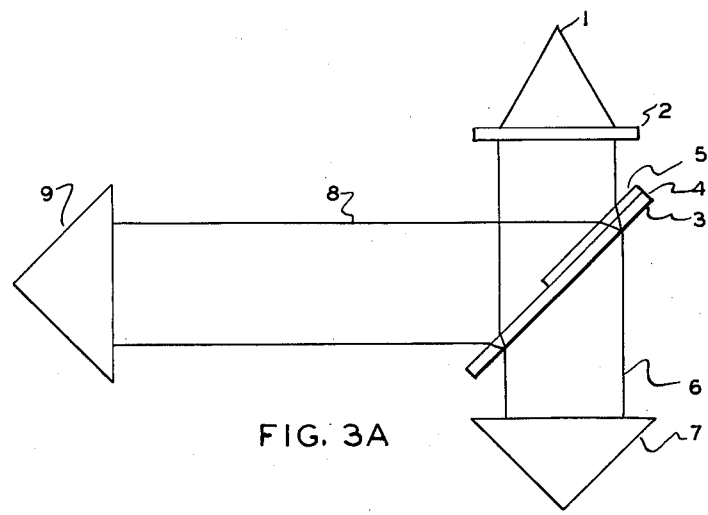
Figure 3B:
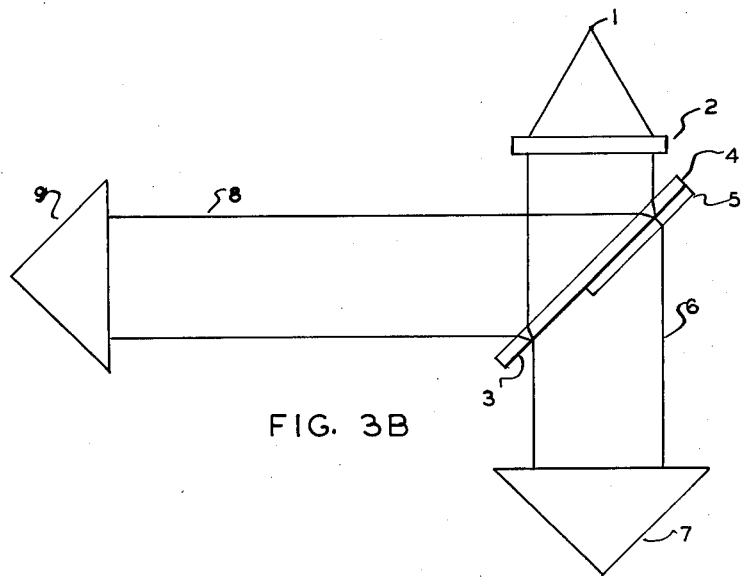
Figure 3C:
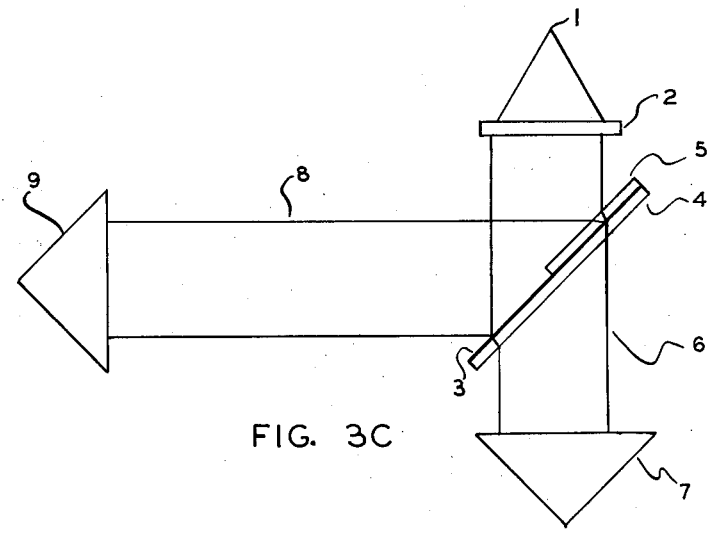

Some of the modifications which are possible while keeping the retardation coating on the beam splitter 4 are shown in Figs. 3A, 3B, and 3C. For example, in Fig. 3A, the beam splitter 4 of Fig. 1 is reversed with the half reflecting surface 3 being maintained on the opposite side from partial retardation coating 5. The necessary phase shift between the two split beams is obtained by the fact that portions of split beam 8 traverse the retardation coating 5, twice, while portions of split beam 6 traverse the retardation coating 5, only once.

In Fig. 3B, the half reflecting surface 3 and retardation coating 5 are placed on the side of beam splitter 4 nearest movable reflecting prism 7. The phase shift provided here is similar to that provided by Fig. 1, in that split beam 6 only traverses the retardation coating 5. While in Fig. 3C the half reflecting surface 3 and retardation coating 5 are placed on the same side of the beam splitter nearest the fixed reflective prism 9. Herein as in Figure 3A the necessary phase shift between the two split beams is obtained by the fact that portions of split beam 8 traverse the retardation coating 5 twice while portions of split beam 6 traverse the retardation coating 5 only once.

Figure 4A:
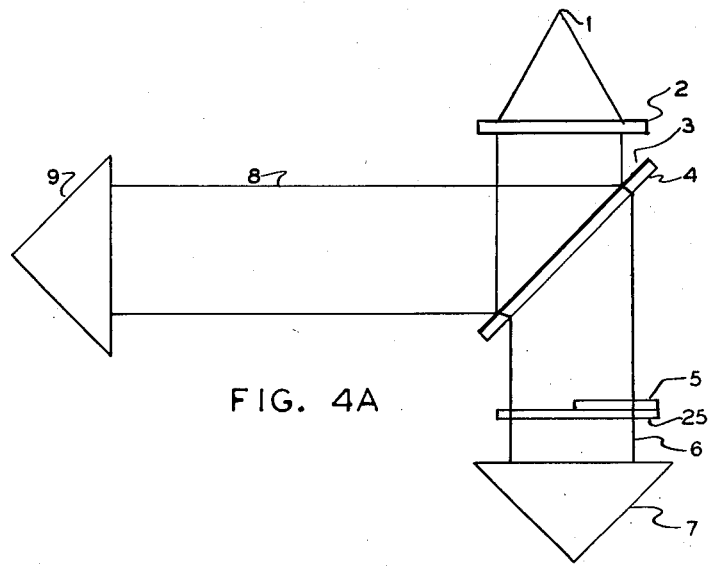
Figs. 4A, 4B, 4C and 4D are diagrammatic views showing various modifications of the present invention with a partial retarding coating on a transparent plate.
Figure 4B:
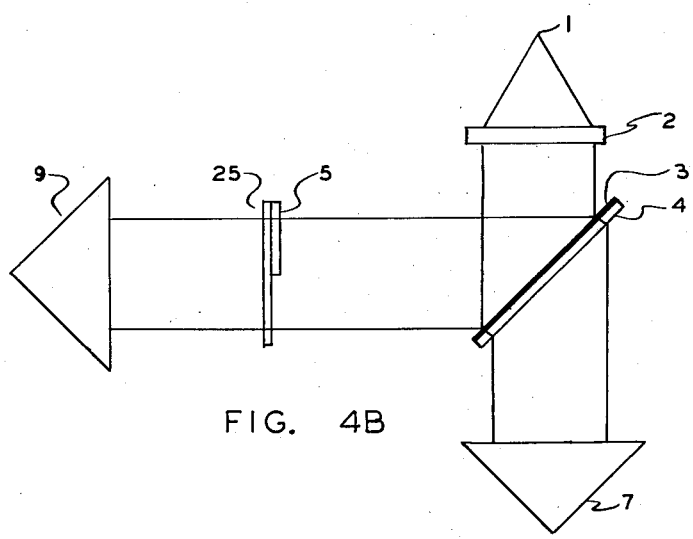
Figure 4C:
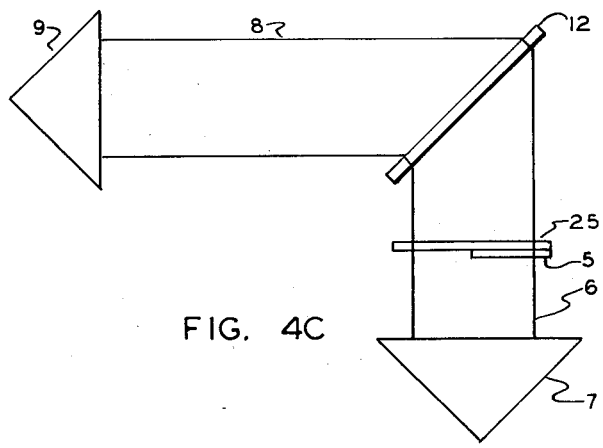
Figure 4D:
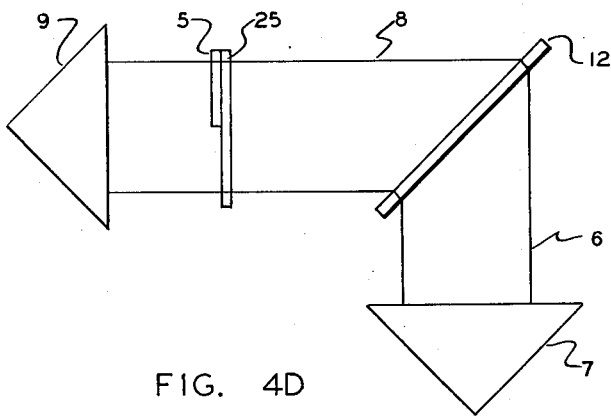

Some of the modifications which are possible by placing the retardation coating 5 on a separate transparent plate 25 position in one of the split beams 8 or 6 are shown in Figs. 4A, 4C and 4D. For example, in Fig. 4A, a transparent plate 25 is placed between the beam splitter 4 and the movable reflecting prism 7 and a partial retardation coating 5 is placed on the side of the transparent plate nearest beam splitter 4. In this way beam splitter 4 functions as in the prior art exemplified by Patent No. 2,604,004, identified above, and the split beam 6 is phase shifted by this partially coated transparent plate 25. Fig. 4B is identical with Fig. 4A except that retarding coating 5 and transparent plate 25 is placed in split beam 8. Figs. 4C and 4D illustrate the positioning of this transparent plate 25 in split beams 6 and 8 respectively between the recombining member 12 and the appropriate reflective prism. Specifically, Fig. 4C places transparent plate 25 with a partially retardation coating 5 between recombining member 12 and movable reflecting prism 7. In Fig. 4D transparent plate 25 with retardation coating 5 is placed in split beam 8 between fixed reflective prism 9 and recombining member 12.

Figure 5A:
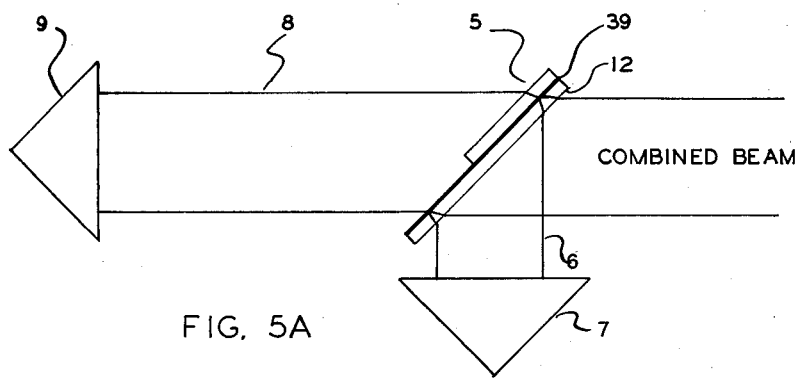
Figs. 5A, 5B, 5C and 5D are diagrammatic views showing various modifications of the present invention with a partial retarding coating on the recombiner.
Figure 5B:
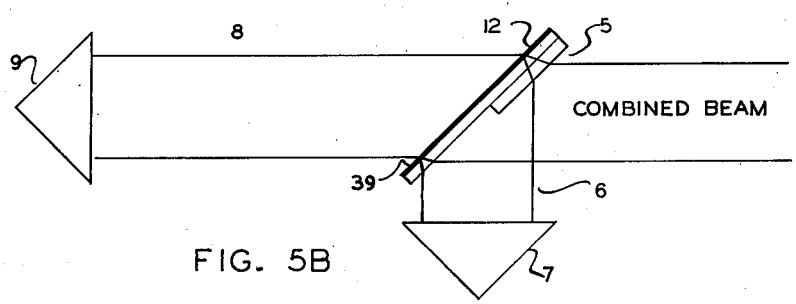
Figure 5C:
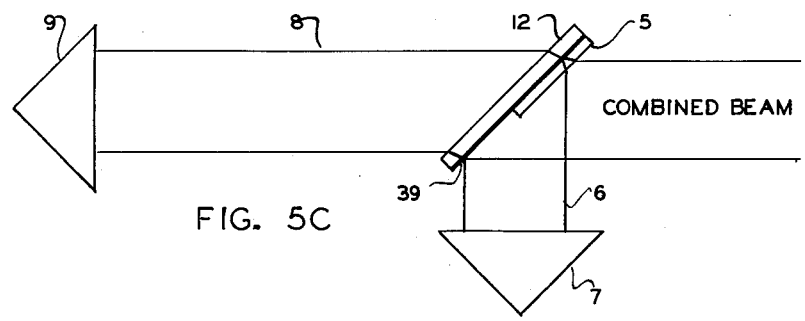
Figure 5D:
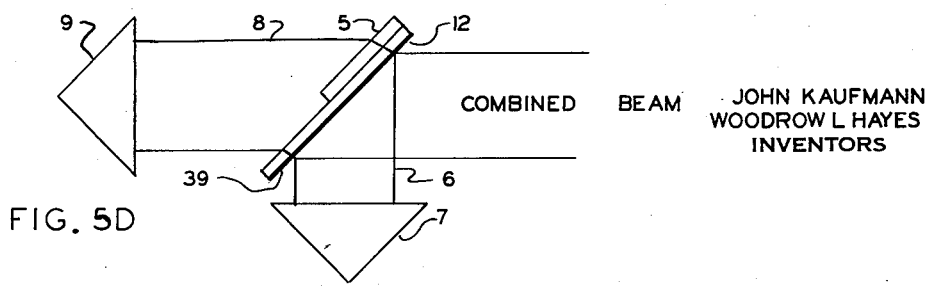

Some of the modifications which are possible by placing the retardation coating 5 on recombining member 12 are shown in Figs. 5A, 5B, and 5C. For example, in Fig. 5A, retardation coating 5 is placed on the same side of the recombining member 12 as half reflective coating 39. Both are on the side of recombining member 12 nearest the fixed reflective prism 9. In this embodiment only split beam 8 passes through the retarding coating 5. In Fig. 5B, retardation coating 5 is placed on beam splitter 12 on the side opposite from half reflecting coating 39 and on the side nearest movable reflective prism 7. This embodiment split beam 6 passes through partial retardation coating 5 prior to recombination with split beam 8. Figs. 5C and 5D show the placing of the retardation coating on recombining member 12 except as set forth in Figs. 5A and 5B except that half reflecting coating 39 has been placed on the opposite side of the reflecting member 12.

Many other modifications are possible by altering the relationship of the split beams, the recombining member, the half reflecting surfaces, the retardation coating, and the beam splitter relative to one another, while providing a partial phase shift in either of the split beams 8 or 6 followed by recombination to form two phase shifted fields of illumination by interference.

Having described our invention, what we claim as new and desire to secure by Letters Patent is:

1. A measuring apparatus comprising a reversibly movable member whose net change of position is to be measured, a light source providing a light beam, optical means including a half reflecting member for splitting said light beam having a partial coating with a determined thickness for providing a phase shift between one portion of said split beams, recombining means responsive to said partially phase shifted split beams for forming by interference two fields of illumination whose intensities vary cyclically as a function of the position of the movable member, the illumination of said two fields being out of phase so that transition through complete intensity ranges occur for the two fields in different position regions of said movable member, and a counter actuated by variations of both fields in one phase relationship to effect a count in one direction and by variations of both fields in opposite phase relationship to effect the count in the other direction, said counter being unresponsive to variations of one field alone, whereby the position of said movable member is uniquely determined by the net number of changes of state in both fields.

2. Interferometric measuring apparatus comprising a reversibly movable member whose net change of position is to be measured, a light source providing a light beam, a reflecting member positioned commensurate with said movable member, a beam splitter means for splitting said light beam and directing one of said split light beams toward said reflecting member, means for recombining said split beams having a partial coating with a determined thickness to provide by retardation a desired phase shift of one portion of said split light beams relative to the other portion of said split light beam, after one of said split light beams has been reflected by said reflecting member thereby forming by interference two fields of illumination whose intensities vary cyclically as a function of the position of said reflecting member with the illumination of the two fields being out of phase so that transitions through complete intensity ranges occur for the two fields in different position regions of said movable member.

3. Interferometric measuring apparatus comprising a reversibly movable member whose net change of position is to be measured, a light source providing a light beam, a reflecting member positioned commensurate with said movable member, a beam spliter means for splitting said light beam and directing one of said split light beams toward said reflecting member, means for recombining said split beams having a partial coating with a determined thickness to provide by retardation a desired phase shift of one portion of said split light beams relative to the other portion of said split light beam, after one of said split light beams has been reflected by said reflecting member, thereby forming by interference two fields of illumination whose intensities vary cyclically as a function of the position of said reflecting member with the illumination of the two fields being out of phase so that the transitions through complete intensity ranges occur for the two fields in different position regions of said movable member, and a counter actuated by variations of both fields in one phase relationship to effect a count in one direction and by variations of both fields in opposite phase relationship to effect a count in the other direction, said counter being unresponsive to variations of one field alone, whereby the position of said movable member is uniquely determined by the net number of changes of state in both fields.

4. Interferometric measuring apparatus comprising a reversibly movable member whose net change of position is to be measured, a light source providing a light beam, a reflecting member positioned commensurate with said movable member, a beam splitter means for splitting said light beam and directing one of said split light beams toward said reflecting member, said beam splitter having a partial coating with a determined thickness to provide by retardation a desired phase shift of one portion of said split light beams relative to the other portion of said split light beam, means for recombining said split beams after one has been reflected by said reflecting member for forming by interference two fields of illumination whose intensities vary cyclically as a function of the position of said reflecting member with the illumination of the two fields being out of phase so that transitions through complete intensity ranges occur for the two fields in different position regions of said movable member, and a counter actuated by variations of both fields in one phase relationship to effect a count in one direction and by variations of both fields in opposite phase relationship to effect a count in the other direction, said counter being unresponsive to variations of one field alone, whereby the position of said movable member is uniquely determined by the net number of changes of state in both fields.

5. Interferometric measuring apparatus comprising a reversibly movable member whose net change of position is to be measured, a light source for providing a light beam, a reflecting member positioned commensurate with said movable member, a beam splitter means for splitting said light beam and directing one of said split light beams toward said reflecting member, means for partially retarding a portion of one of said split light beams thereby providing a phase shift relative to the other portion of said split light beam, means for recombining said split beams after one has been reflected by said reflecting member for forming by interference two fields of illumination whose intensities vary cyclically as a function of the position of said reflecting member with the illumination of the two fields being out of phase so that transitions through compelte intensity ranges occur for the two fields in different position regions of said movable member, and a counter actuated by variations of both fields in one phase relationship to effect a count in one direction and by variations of both fields in opposite phase relationship to effect the count in the other direction, said counter being unresponsive to variations of one field alone, whereby the position of said movable member is uniquely determined by the net number of changes of state in both fields.

6. Interferometric measuring apparatus comprising a reversibly movable member whose net change of position is to be measured, a light source providing a light beam, a reflecting member positioned commensurate with said movable member, a beam splitter means for splitting said light beam and directing one of said split light beams toward said reflecting member, said beam splitter having a partial coating with a determined thickness to provide by retardation a desired phase shift of one of said split light beams relative to said other split light beam, means for recombining said split beams after one has been reflected by said reflecting member for forming by interference two fields of illumination whose intensities vary cyclically as a function of the position of said reflecting member with the illumination of the two fields being out of phase so that transitions through complete intensity ranges occur for the two fields in different position regions of said movable member.

7. Interferometric measuring apparatus comprising a reversibly movable member whose net change of position is to be measured, a light source for providing a light beam, a first reflective prism positioned commensurate with said movable member, a second fixed reflective prism, a beam splitter means for splitting said light beam and directing one of said split light beams toward said movable first reflective prism and the other of said split light beams toward said fixed second reflective prism, means for partially retarding one portion of said split light beams thereby providing a phase shift relative to the other portion of said split light beam, a recombining means for combining said split beams after each have been reflected by said first and second reflective prism respectively for forming by interference two fields of illumination whose intensities vary cyclically as a function of the position of said first reflective prism with the illumination of the two fields being out of phase so that transitions through complete intensity ranges occur for the two fields in different position regions of said movable member, and a counter actuated by variations of both fields in one phase relationship to effect a count in one direction and by variations of both fields in opposite phase relationship to effect the count in the other direction, said counter being unresponsive to variations of one field alone, whereby the position of said movable member is uniquely determined by the net number of changes of state in both fields.

8. Interferometric measuring apparatus of claim 7 wherein said means for partially retarding one of said light beams comprises a coating of determined thickness on a surface of said beam splitter.

9. Interferometric measuring apparatus of claim 7 wherein said means for partially retarding one of said light beams comprises a partial coating of a determined thickness on the non-reflecting surface of said recombining means.

10. Interferometric measuring apparatus of claim 7 wherein said means for partially retarding one of said split light beams comprises a partial coating of determined thickness on the reflective surface of said combining means.

11. Interferometric measuring apparatus of claim 7 wherein said means for partially retarding one of said split light beams comprises a partial retardation coating of a determined thickness on a transparent plate placed in said split light beam between said beam splitter and said movable reflective prism.

12. Interferometric measuring apparatus of claim 7 wherein said means for partially retarding one of said split light beams comprises a partial retardation coating of a determined thickness on a transparent plate placed in said split beam between said beam splitter and said fixed reflective prism.

13. Interferometic measuring apparatus of claim 7 wherein said means for partially retarding one of said split light beams comprises a partial retardation coating of a determined thickness on a transparent plate placed in said split beam between said movable reflective prism and said recombining means.

14. Interferometric measuring apparatus of claim 7 wherein said means for partially retarding one of said split light beams comprises a partial retardation coating of a determined thickness on a transparent plate placed in said split beam between said fixed reflective prism and said recombining means.

15. A measuring apparatus comprising a movable member whose net change of position is to be measured, a light source, beam splitting means and beam recombining means responsive to said light source for providing and recombining a first and second split light beam, one of said split light beams being directed over a reference path length, the other of said split light beams being directed over a variable path length, the length of said variable path length being determined by the position of said movable member, and means having plural portions of differing refractive index disposed in the path of one of said split light beams, whereby two fields of illumination are produced by interference in the recombined beam.

16. A measuring apparatus according to claim 15 in which said means having plural portions of differing refractive indices comprises a partial coating having a determined thickness disposed on one surface of said beam splitter in the path of one of said split light beams.

17. A measuring apparatus according to claim 15 wherein said means having plural portions of differing refractive indices comprises at least one transparent plate placed in the path of at least one of said split light beams, said plate having a partial coating of a determined thickness thereon.

18. A measuring apparatus comprising a moveable member whose net change of position is to be measured, a light source, beam splitting and recombining means responsive to such light source for providing and recombining a first and second split light beam, one of said split light beams being directed over a reference path length including reflective means, the other of said split light beams being directed over a variable path length including reflective means, the length of said variable path length being determined by the position of said moveable member, and means separate from said reflective means placed in one of said split light beams for providing a determined phase shift of one portion thereof from another, whereby two fields of illumination are produced by interference in the recombined beam.

19. A measuring apparatus comprising a reversibly moveable member whose net change of position is to be measured, optical means comprising beam splitting means and beam recombining means, said optical means including a member having a partial coating with a determined thickness to provide by retardation a desired phase shift of a light beam for forming by inteference two fields of illumination whose intensities vary cyclically as a function of a position of said moveable member, the illumination of said two fields being out of phase so that a transition through complete intensity ranges from one maximum to the next maximum occurs for the two fields in different position regions of said moveable member and a counter actuated by variations of both fields in one phase of relationship to effect a count in one direction and by variations of both fields in the opposite phase relationship to effect a count in the other direction, said counter being unresponsive to variations of one field alone whereby the position of said member is uniquely determined by the net number of changes of state in both fields.

20. A measuring apparatus comprising a reversibly moveable member whose net change of position is to be measured, optical means comprising beam splitting means and beam recombining means, said optical means including a member having a partial coating with a determined thickness to provide by retardation a desirable phase shift of a portion of a light beam for forming by interference two fields of illumination whose intensities vary cyclically as a function of the position of said moveable member, said partial coating being located on an area chosen to minimize the adverse effects of imperfect optical components traversed by the light beam, the illumination of said two fields being out of phase so that transition through complete intensity ranges occurs for the two fields in different position regions of said moveable member and a counter actuated by variations of both fields in one phase relationship to effect a count in one direction and by variations of both fields in opposite phase relationship to effect a count in the other direction, said counter being unresponsive to variations of one field alone whereby the position of said member is uniquely determined by the net number of changes of state in both fields.

References Cited in the file of this patent

UNITED STATES PATENTS

| | | |
|---|---|---|
| 2,151,631 | Williams | Mar. 21, 1939 |
| 2,479,802 | Young | Aug. 23, 1949 |
| 2,571,937 | Peck | Oct. 16, 1951 |
| 2,583,596 | Root | Jan. 29, 1952 |
| 2,604,004 | Root | July 22, 1952 |

OTHER REFERENCES

"A Bidirectional Electronic Counter for Use in Optical Interferometry," Branin, pages 839–848, Journal of the Optical Society of America, vol. 43, October 1953.

"Interferometers Autocompenses," Cagnet, article in Revue d'Optique, pages 113–125, vol. 33, Nos. 2–3, February–March 1954.